(12) United States Patent
Lim

(10) Patent No.: US 9,602,171 B2
(45) Date of Patent: Mar. 21, 2017

(54) NEAR FIELD COMMUNICATION DEVICE

(75) Inventor: Ruth Ann Lim, Santa Clara, CA (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 0 days.

(21) Appl. No.: 14/423,807

(22) PCT Filed: Aug. 27, 2012

(86) PCT No.: PCT/US2012/052540
§ 371 (c)(1),
(2), (4) Date: Feb. 25, 2015

(87) PCT Pub. No.: WO2014/035370
PCT Pub. Date: Mar. 6, 2014

(65) Prior Publication Data
US 2015/0207544 A1    Jul. 23, 2015

(51) Int. Cl.
*H04B 5/00* (2006.01)
*H04M 1/725* (2006.01)

(52) U.S. Cl.
CPC ......... *H04B 5/0056* (2013.01); *H04B 5/0031* (2013.01); *H04M 1/7253* (2013.01); *H04M 2250/04* (2013.01)

(58) Field of Classification Search
CPC ......... H04M 15/00; H04W 4/24; H04W 4/26; G06F 21/34; G06F 21/35; G06F 21/36;
(Continued)

(56) References Cited

U.S. PATENT DOCUMENTS 7,815,101 B2    10/2010 Shafer
8,244,179 B2    8/2012 Dua
(Continued)

FOREIGN PATENT DOCUMENTS

KR    10100209 B1    12/2010

OTHER PUBLICATIONS

NXP Semiconductors, "NFC TagWriter by NXP," May 16, 2012, Android Apps on Google Play, (Web Page), <http://web.archive.org/web/20120516153500/https://play.google.com/store/apps/details?id=com.nxp.nfc.tagwriter&hl=en>.
(Continued)

*Primary Examiner* — Ping Hsieh
(74) *Attorney, Agent, or Firm* — HP Inc. Patent Department

(57) ABSTRACT

A near field communication device is disclosed herein. An example of such a device includes a user interface and an application that displays information on the user interface. The device also includes a non-transitory storage medium including a list of data elements that may appear within the information displayed in the user interface and a near field communication filter module to automatically extract any of the data elements from the information displayed on the user interface via the application. The example additionally includes a near field communication write module to automatically record any of the extracted data elements transferred by the near field communication filter module to a near field communication data tag. Examples of a method for use in a near field communication device and a non-transitory storage medium are also disclosed herein.

18 Claims, 3 Drawing Sheets

(58) Field of Classification Search
CPC .... G06F 21/51; H04N 21/431; H04B 5/0025; H04B 5/005; H04B 5/0056; H04B 5/0062; H04B 5/0068
USPC .......... 340/10.1, 10.4, 572.1; 455/41.1, 41.2, 455/41.3, 412.1
See application file for complete search history.

(56) References Cited

U.S. PATENT DOCUMENTS

| | | |
|---|---|---|
| 2007/0135112 A1 | 6/2007 | Lessing |
| 2007/0265033 A1 | 11/2007 | Brostrom |
| 2011/0105030 A1* | 5/2011 | Matsuo .............. G06K 17/0022 455/41.2 |
| 2011/0263204 A1* | 10/2011 | Isomursu ................ H04L 67/12 455/41.2 |
| 2011/0287718 A1 | 11/2011 | Abel et al. |
| 2013/0109307 A1* | 5/2013 | Reisgies ................ H04L 63/08 455/41.1 |

OTHER PUBLICATIONS

International Search Report and Written Opinion received in PCT Application No. PCT/US2012/052540, Mar. 29, 2013, 12 pages.

* cited by examiner

NEAR FIELD COMMUNICATION DEVICE

BACKGROUND

Consumers appreciate ease of use in their electronic devices. They also appreciate automation of certain tasks which are necessary for them to utilize features of their electronic devices. Designers and manufacturers may, therefore, endeavor to create or build electronic devices directed toward one or more of these objectives.

BRIEF DESCRIPTION OF THE DRAWINGS

The following detailed description references the drawings, wherein.

DETAILED DESCRIPTION

Users of ear field communication ("NFC") technology may want to record information from an application on a near field communication device to a near field data tag. This typically requires that a user first decide which data element or data elements he or she wants to record. Next, the user launches or opens a program (e.g., an NFC tag editor) that allows the data element(s) to be written to the near field data tag. The user then must enter the data element(s) into the NFC tag editor for transfer to the near field data tag.

This process can be time consuming for some users who would prefer that it be automated so that they can spend time on other tasks or use their NFC device for other things that they deem to be more important, enjoyable, and/or interesting. Unfortunately, this process can also lend itself to errors in the data element(s) written to a near field data tag due to a user incorrectly entering the information into the NEC tag editor.

Figure 1:
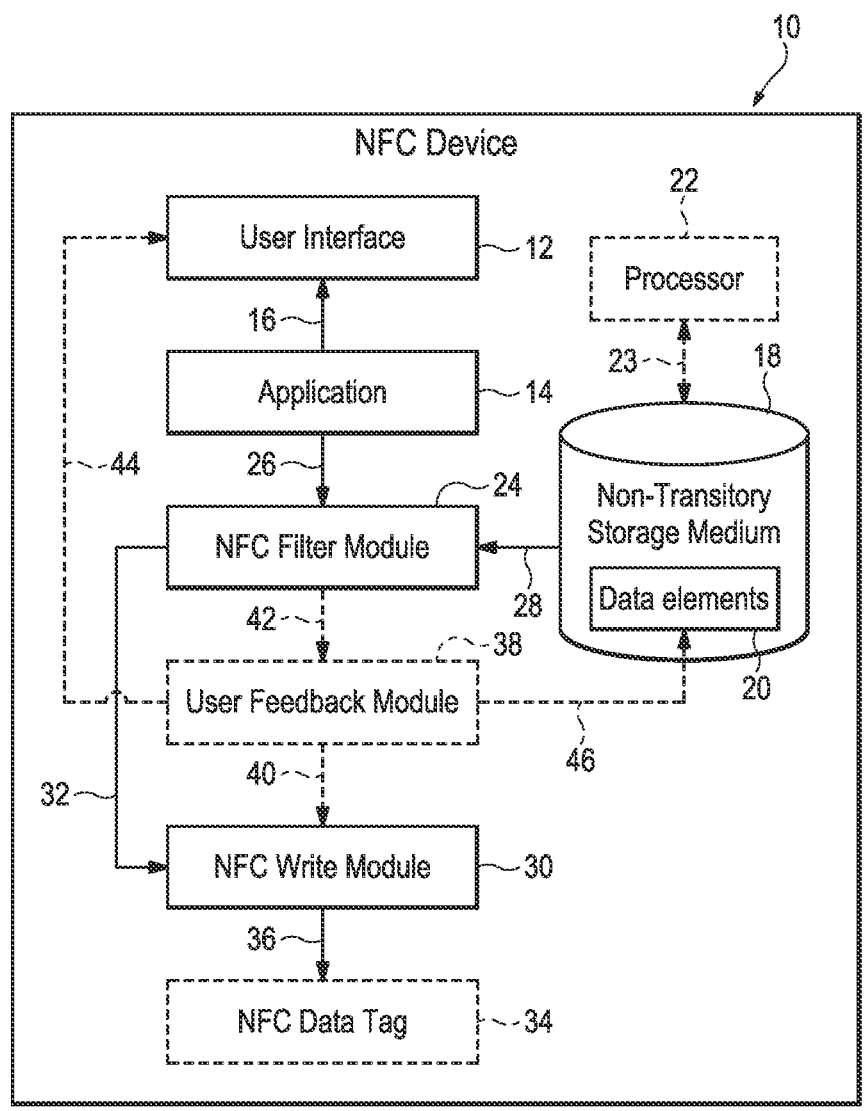
FIG. 1 is an example of a near field communication device.

A near field communication device 10 directed to addressing these challenges is illustrated in FIG. 1. As used herein, the term "near field communication" and "NFC" are defined as including, but not necessarily being limited to, a technology for devices to establish communication with each other by touching them together or bringing them into close proximity (e.g., a distance of approximately four (4) centimeters (cm) or less). This communication can be encrypted or unencrypted. This communication may also be established over radio frequencies (e.g., 13.56 megahertz (MHz) on an ISO/IEC 18000-3 air interface) and at varying data rates (e.g., 106 Kbits/sec. to 424 Kbits/sec.). Near field communication devices can engage in two-way communication with one another, as well as one-way communication with near field communication data tags. Portions of near field communication technology have been approved as standards (e.g., ISO/IEC 18092/ECMA-340 and ISO/IEC 21481/ECMA-352).

As used herein, the term "near field communication data tag", "near field communication tag", "NFC data tag", and "NFC tag" are defined as including, but not necessarily being limited to, a near field communication device that contains or stores data. This data may be read-only or rewriteable. Examples of near field communication data tags include, but are not necessarily limited to, tickets, information signs or placards, security passes, currency, or storage devices containing data formatted to a data tag specification.

Devices using near field communication may be active or passive. A passive NFC device, such as an NEC data tag, contains information that other devices can read, but does not read any information itself. Active devices can read information, as well as send it. An active NFC device, is not only able to collect information from an NFC tag, but also able to exchange information and data with other active NFC devices. An active NFC device can even alter information or data on a passive NFC device, if authorized to make such changes.

As used herein, the terms "non-transitory storage medium" and non-transitory computer-readable storage medium" are defined as including, but not necessarily being limited to, any media that can contain, store, or maintain programs, information, and data. Non-transitory storage medium and non-transitory computer-readable storage medium may include any one of many physical media such as, for example, electronic, magnetic, optical, electromagnetic, or semiconductor media. More specific examples of suitable non-transitory storage medium and non-transitory computer-readable storage medium include, but are not limited to, a magnetic computer diskette such as floppy diskettes or hard drives, magnetic tape, a random access memory (RAM), a read-only memory (ROM), an erasable programmable read-only memory (EPROM), a flash drive, a compact disc (CD), or a digital video disk (DVD).

As used herein, the term "processor" is defined as including, but not necessarily being limited to, an instruction execution system such as a computer/processor based system, an Application Specific Integrated Circuit (ASIC), a computing device, or a hardware and/or software system that can fetch or obtain the logic from a non-transitory storage medium or a non-transitory computer-readable storage medium and execute the instructions contained therein. "Processor" can also include any controller, state-machine, microprocessor, cloud-based utility, service or feature, or any other analogue, digital and/or mechanical implementation thereof.

As used herein, "device" is defined as including, but not necessarily being limited to, a computer, a phone, a tablet, personal digital assistant, or other similar device. As used herein, "automatic" or "automatically" are defined as including, but not necessarily being limited to, an action, process, function, task, operation, work, or procedure that is performed, executed, or otherwise carried out independent of or without requiring action, input, or effort on the part of a user of a device, such as a near field communication device.

As used herein, "application" is defined as including, but not necessarily being limited to, a program or set of instructions operating or executing in software, firmware, and/or hardware for engaging in, performing, and/or completing a task or tasks, and displaying information (e.g., text, numbers, graphics, photos, charts, formulas, etc.) to one or end users via user interface of a device. Examples of an "application" include, but are not necessarily limited to, a web browser, email, instant messenger, a really simple syndication reader, word processor, database program, game, or program that generates at least one bit of data that a user may want to store on NFC data tag.

As used herein, "data element" and "data elements" are defined as including, but not necessarily being limited to, certain types or categories of information that may be a subset, component, or part of a larger set, collection, or item of information. Examples of a "data element" or "data elements" include, but are not necessarily limited to, a uniform resource identifier ("URI"), text, virtual business card ("VCard"), phone number, macro, program, and an application defined data type.

Referring again to FIG. 1, near field communication device 10 includes a user interface 12, such a screen, which information may be displayed, and an application 14 that displays such information on user interface 12, as generally indicated by arrow 16. As can be seen in FIG. 1, NFC device 10 also includes a non-transitory storage medium 18 that includes a list or database 20 of data elements that may appear within the information displayed in user interface 12. Non-transitory storage medium 18 also includes instructions executable by a processor 22 associated with NFC device 10, as generally indicated by dashed double-headed arrow 23, and discussed more fully below.

As can also be seen in FIG. 1, near field communication device 10 additionally includes a near field communication filter module 24 to automatically extract any of the data elements from the information displayed on user interface 12 via application 14, as generally indicated by arrow 26. As discussed above, these data elements are received by NFC filter module 24 from list or database 20 of non-transitory storage medium 18, as generally indicated by arrow 28. NFC device 10 further includes a near field communication write module 30 to automatically record any of the extracted data elements transferred to it by near field communication filter module 24, as generally indicated by arrow 32, to a near field communication data tag 34, as generally indicated by arrow 36.

As can additionally be seen in FIG. 1, one or more examples of near field communication device 10 may include data tag 34 within device 10. In other examples, data tag 34 may be outside of device 10. Similarly, one or more examples of NFC device 10 may include processor 22 within device 10. In other examples, processor 22 may be outside of device 10. Furthermore, in one or more examples of NFC device 10, non-transitory storage medium 18 and processor 22 may control operation and execution of application 14, near field communication filter module 24, and/or near field communication write module 30.

As can further be seen in FIG. 1, one or more examples of near field communication device 10 may include a user feedback module 38 that controls which of the extracted data elements are transferred to near field communication write module 30 by near field communication filter module 24, as generally indicated by respective dashed arrows 40 and 42. In such cases, arrow 32 is not present and is replaced by arrows 40 and 42. Also, in such cases, non-transitory storage medium 18 and processor 22 may control operation and execution of user feedback module 38.

User feedback module 38 may be designed to control which of the extracted data elements are transferred to NFC write module 30 in a variety of ways. In the example illustrated in FIG. 1, user feedback module 38 would present the extracted data elements to an end-user of NFC device 10 via user interface 12, as generally indicated by dashed arrow 44. The end-user may then select which of these extracted data elements are transferred to write module 30.

The data elements stored in list or database 20 of non-transitory storage medium 18 may be created in a variety of ways such as pre-programming them or utilizing a script. In the example of near field communication device 10 illustrated in FIG. 1, they may also be created and/or modified based on user feedback through user feedback module 38, as generally indicated by dashed arrow 46.

Figure 2:
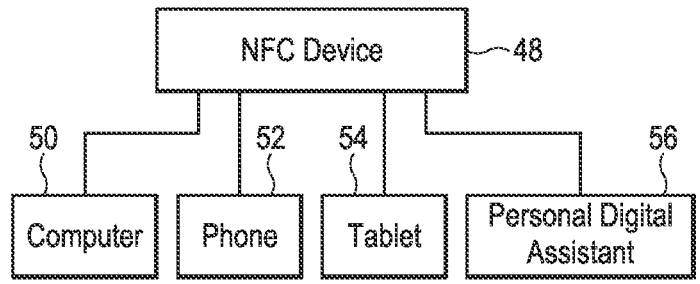
FIG. 2 is an example of various types of near field communication devices.

FIG. 2 is an example of various types of near field communication devices 48 that can implement the technology of NFC device 10 of FIG. 1. As can be seen in FIG. 2, NFC device 48 can include a computer 50, a phone 52, a tablet 54, and/or a personal digital assistant (PDA) 56. Computer 50 may take on a variety of forms including, for example, a desktop unit, laptop, server, etc. Phone 52 may also take on a variety of forms including, for example, stand-alone mobile devices (e.g., "cell phones"), as well as those providing other functionality and/or applications.

Figure 3:
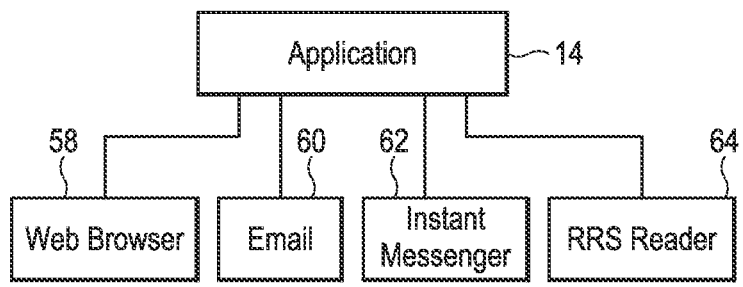
FIG. 3 is an example of various types of applications.

An example of various types of applications 14 is shown in FIG. 3. As can be seen in FIG. 3, application 14 can include a web browser 58, an email program 60, an instant messenger ("IM") program 62, and/or a really simple syndication ("RRS") reader for use with a web syndication format.

Figure 4:
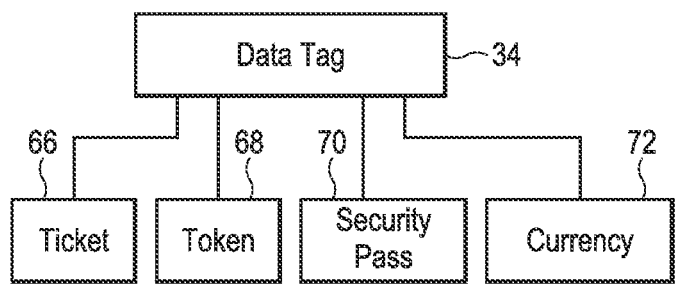
FIG. 4 is an example of various types of near field communication data tags.

An example of various types of near field communication data tags 34 is shown in FIG. 4. As can be seen in FIG. 4, NFC data tag 34 can include a ticket 66 (e.g., for transportation or an event), a token 68, a security pass 70, or currency 72. Although not shown in FIG. 4, it is to be understood that data tag 34 can include may other types data elements and information, such as directions, schedules, news, etc.

Figure 5:
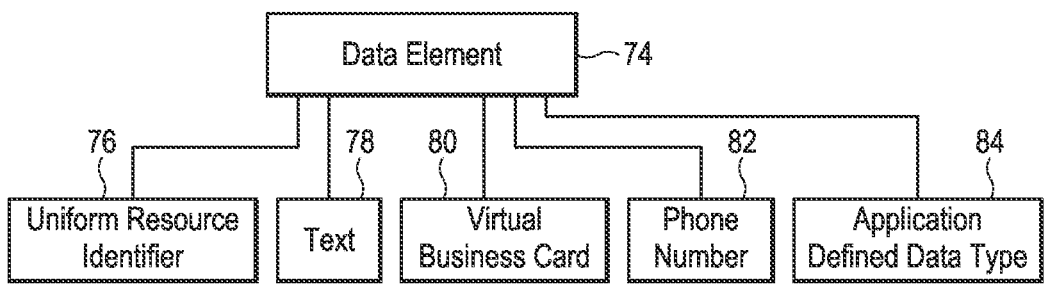
FIG. 5 is an example of various types of data elements.

An example of various types of near field communication data elements 74 stored in list or database 20 of non-transitory storage medium 18 is illustrated in FIG. 5. As can be seen in FIG. 5, data element 74 can include a uniform resource indicator ("URI") 76, text 78, a virtual business card ("VCard") 80, or a phone number 82. As can also be seen in FIG. 5, data element 74 can additionally include an application defined data type 84 for use with a specific application 14.

Figure 6:
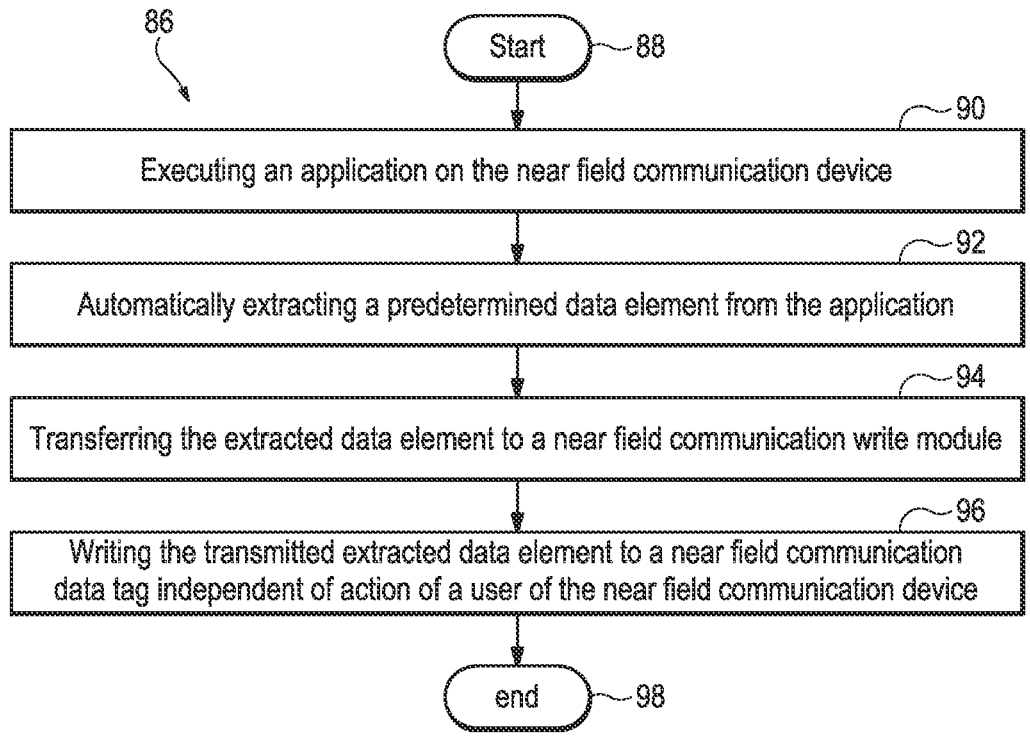
FIG. 6 is an example of a method for use in a near field communication device.

An example of a method 86 for use in near field communication device 10 and/or NEC devices 48 is shown in FIG. 6. As can be seen in FIG. 6, method 86 starts or begins 88 by executing an application on the near field communication device, as indicated by block 90, and automatically extracting a predetermined data element from the application, as indicated by block 92. Method 86 continues by transferring the extracted data element to a near field communication write module, as indicated by block 94, and writing the transmitted extracted data element to a near field communication data tag independent of action of a user of the near field communication device, as indicated by block 96. Method 86 may then end 98.

Figure 7:
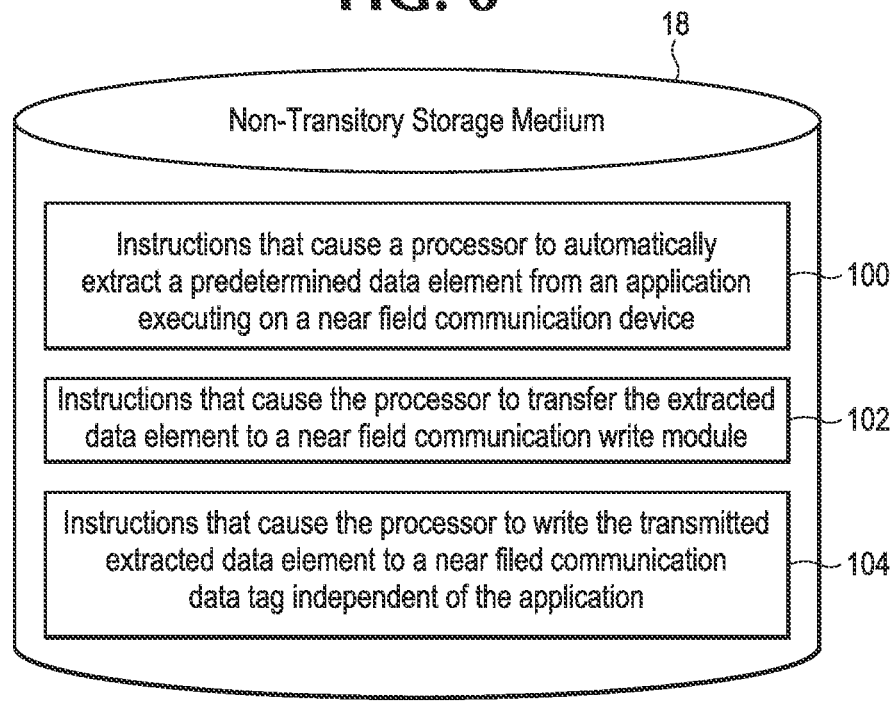
FIG. 7 is an example of a non-transitory storage medium.

FIG. 7 is an example illustrating some of the instructions on non-transitory storage medium 18 of FIG. 1. Although not shown in FIG. 7, it is to be understood that list or database 20 of data elements is also present on non-transitory storage medium 18 illustrated in FIG. 7. As can be seen in FIG. 7, non-transitory storage medium 18 includes instructions that cause processor 22 to automatically extract a predetermined data element from an application executing on a near field communication device (such as NFC device 10 and/or NFC devices 48), as generally indicated by block 100. Non-transitory storage medium 18 includes additional instructions that cause processor 22 to transfer the extracted data element to a near field communication write module, as generally indicated by block 102. Non-transitory storage medium 18 includes further instructions that cause processor 22 to write the transmitted extracted data element to a near field communication data tag independent of the application, as indicated by block 104.

Although several examples have been described and illustrated in detail, it is to be clearly understood that the same are intended by way of illustration and example only. These examples are not intended to be exhaustive or to limit the invention to the precise form or to the exemplary embodiments disclosed. Modifications and variations may well be apparent to those of ordinary skill in the art. The spirit and scope of the present invention are to be limited only by the terms of the following claims.

Additionally, reference to an element in the singular is not intended to mean one and only one, unless explicitly so stated, but rather means one or more. Moreover, no element or component is intended to be dedicated to the public regardless of whether the element or component is explicitly recited in the following claims.

What is claimed is:

1. A near field communication device, comprising:
   a user interface;
   a processor;
   an application program executable on the processor to display information in the user interface;
   a non-transitory storage medium storing a near field communication filter module and a near field communication write module;
   the near field communication filter module executable on the processor to automatically extract, from the application program executing in the near field communication device, data elements from the information displayed in the user interface by the application program; and
   the near field communication write module executable on the processor to automatically record the extracted data elements to a physical near field communication data tag using near field communication.

2. The near field communication device of claim 1, wherein the near field communication device includes one of a computer, a phone, a tablet, and a personal digital assistant.

3. The near field communication device of claim 1, wherein the application program includes one of a web browser, an email application, an instant messenger, and a really simple syndication reader.

4. The near field communication device of claim 1, wherein at least one the data elements includes a uniform resource identifier, text, a virtual business card, a phone number, and an application defined data type.

5. The near field communication device of claim 1, further comprising the physical near field communication data tag.

6. The near field communication device of claim 5, wherein the physical near field communication data tag includes one of a ticket, a token, a security pass, and a currency.

7. The near field communication device of claim 1, further comprising a user feedback module executable on the processor to control which of the extracted data elements are transferred to the near field communication write module.

8. A method for use in a near field communication device, comprising:
   executing an application on the near field communication device;
   automatically extracting a user interface data element from the application executing on the near field communication device, the extracted user interface data element being one of plural user interface data elements displayed by the application on a user interface;
   transferring the extracted user interface data element to a near field communication write module; and
   writing the transferred extracted user interface data element to a physical near field communication data tag independent of action of a user of the near field communication device.

9. The method of claim 8, wherein one of the near field communication write module and the physical near field communication data tag are on the near field communication device.

10. The method of claim 8, wherein the writing is performed by the near field communication write module executed on the near field communication device.

11. The method of claim 8, wherein the application includes one of a web browser, an email application, an instant messenger, and a really simple syndication reader.

12. The method of claim 8, wherein the extracted user interface data element includes one of a uniform resource identifier, text, a virtual business card, a phone number, and an application defined data type.

13. The method of claim 8, wherein the extracted user interface data element is created based upon one of pre-programming, scripting, and user feedback.

14. A non-transitory storage medium storing instructions that, when executed by a near field communication device, cause the near field communication device to:
   automatically extract a user interface data element from an application executing on a near field communication device, the extracted user interface element being one of plural user interface data elements displayed by the application on a user interface;
   transfer the extracted user interface data element to a near field communication write module; and
   write, by the near field communication write module executed on the near field communication device, the transferred extracted user interface data element to a physical near field communication data tag independent of the application.

15. The non-transitory storage medium of claim 14, wherein the near field communication device includes one of a computer, a phone, a tablet, and a personal digital assistant.

16. The non-transitory storage medium of claim 14, wherein the extracted user interface data element is created based upon one of pre-programming, scripting, and user feedback.

17. The non-transitory storage medium of claim 14, further wherein the application includes one of a web browser, an email application, an instant messenger, and a really simple syndication reader.

18. The non-transitory storage medium of claim 14, wherein writing the transferred extracted user interface data element to the physical near field communication data tag uses near field communication between the near field communication device and the physical near field communication data tag.

* * * * *